Dec. 28, 1965 E. R. BULE 3,225,734
EXTENSIBLE FLAG POLE
Filed Nov. 29, 1963
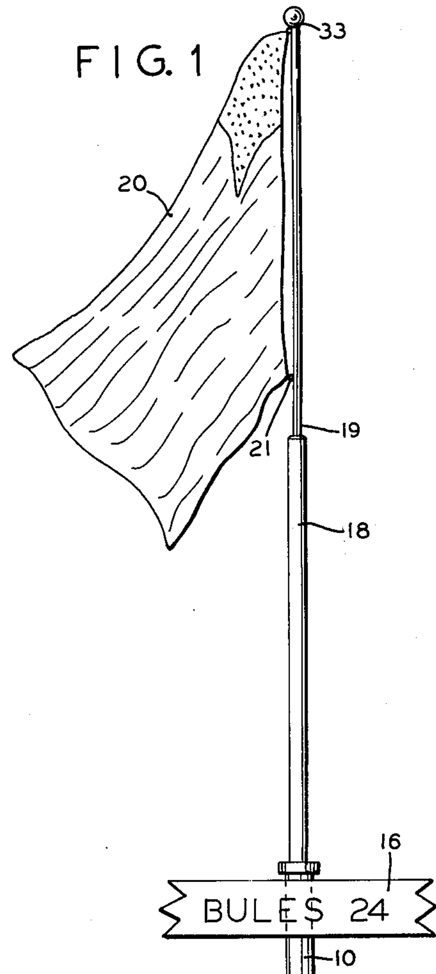
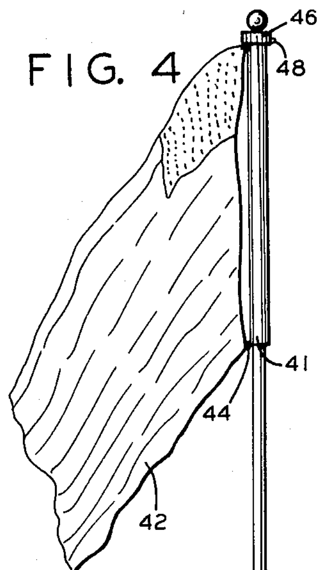
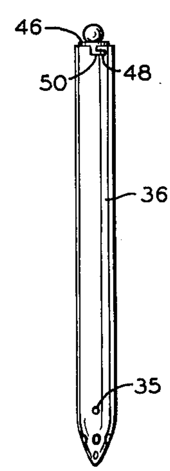
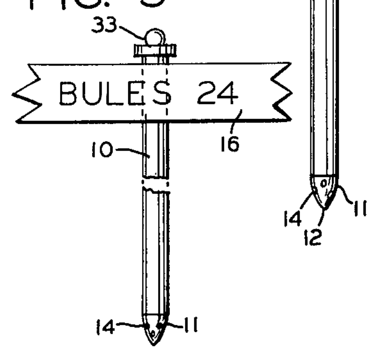
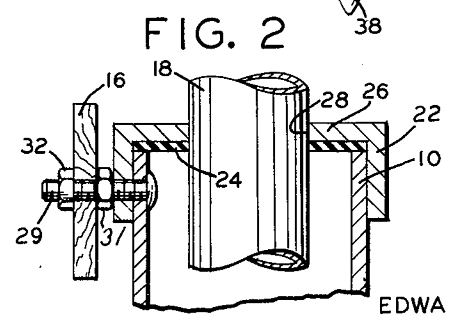
INVENTOR.
EDWARD R. BULE
BY John P. Chandler
HIS ATTORNEY.

United States Patent Office 3,225,734 Patented Dec. 28, 1965

3,225,734

EXTENSIBLE FLAG POLE

Edward R. Bule, Mamaroneck, N.Y., assignor to All-N-One Products Corporation, New Rochelle, N.Y., a corporation of New York Filed Nov. 29, 1963, Ser. No. 326,948
1 Claim. (Cl. 116—173)

This invention relates to extensible flag poles primarily for lawns in front of homes and relates more particularly to a novel telescopic flap pole and nameplate holder primarily for home use.

An important object of the invention is to provide a novel telescopic flag pole having a lower section firmly secured in the ground and which receives the other sections when in closed position but which forms a firm support for the extensible sections when they are raised to flag-supporting position and also providing moisture-tight seals between the sections when they are so extended. The tubular ground support has a tapered lower end for easy insertion into the ground and the tapered portion has holes below the ground line to permit convenient drainage means. At the upper end of this ground support tube, there are provided means for effectively sealing the tube against the entry of rain or snow. When it is desired to telescope the support, the flag is simply removed and the several sections telescoped into the tubular ground support.

In one form of the invention, means are provided for conveniently mounting a nameplate on the tubular ground support which may also be employed if desired for supporting an ordinary flag pole of the non-telescoping variety.

In a modified form of the invention, the telescopic section of greatest diameter is at the top and the flag secured thereto, is simply wrapped around this upper tubular section and the several sections manually pushed into the tubular ground support which has an inside diameter sufficiently large to receive the flag wrapped tube and the other extensible sections.

In the drawing:

FIG. 1 is a front elevation of an extensible flag pole and nameplate holder embodying the present invention;

FIG. 2 is an enlarged vertical section taken through the upper end of a tubular housing;

FIG. 3 is a front elevation showing the parts in closed position;

FIG. 4 is a front elevation, partially in section, of a modified form of the invention and showing the parts in extended position; and FIG. 5 is a front elevation showing the parts in closed position.

Referring now to FIGS. 1–3 of the drawing, there is shown at 10 a lower tubular section which receives the extensible parts when in closed position. This lower section has a closed tapered lower end 11 which terminates in substantially a point 12 in order to facilitate moving the same into the ground. This tapered section also has a plurality of holes 14 which provide means for draining any water which might accumulate in the tubular section and into the ground. At the upper end of this fixed lower section, a nameplate 16 is secured by any suitable means, and one specific means is shown in FIG. 2.

There are two extensible or telescopic sections 18 and

19, the latter supporting a flag 20 such as by rings 21 which receive cords (not shown) for tying the flag to the rings. The tubular ground section has an inner diameter larger than the lower tubular section 18 and the assembly is shown in FIG. 2 wherein a cap comprising collar 22 is fitted on the top of this tubular ground section and a sealing gasket 24 is placed between the upper end of this latter section and a top wall 26 of the collar which has an opening 28 aligned with the opening in the gasket. A threaded pin 29 is mounted in an opening in the tubular ground member and the collar and a nut 31 secures the collar in place. This threaded pin passes through the nameplate 16 and is secured by a nut 32.

The gasket forms an effective seal to prevent rain and snow from passing into the tubular base section. When the flag has been removed and the flag support telescoped, a cap 33 seals the assembly.

In the modified form of the invention shown in FIGS. 4 and 5, the telescopic arrangement is reversed and there is a lower rod 34 secured at its lower end by pin 35 in the tubular base section 36 which again has the tapered lower end 37 to be pushed into the ground. It also has apertures 38 for drainage purposes.

The first telescopic section 39 has a pair of spaced gaskets 40 secured to the tubular section 39 by any suitable means and these gaskets have the two-fold function of supporting section 39 in secure vertical position when in the extended position of FIG. 4 and also to effectively seal the upper end of tube 36 against the introduction of water from rain or snow. The upper telescopic section 41 is carried on lower section 39 and when the flag 42 which is secured thereto at 44 is not in use the parts are to be moved into closed position, the flag may be wrapped around the upper section 41 and both telescopic sections move downwardly into the tubular ground section 36. A cap 46 carried at the upper end of section 41 has a pin 48 which passes into a bayonet slot 50 to secure the flag assembly in the tubular ground section by turning the cap slightly as shown. The gaskets 40 also wipe the inside of tube 36 and keep it clean for the flag.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claim, and that all modifications that come within the meaning and range of equivalency of the claim are intended to be included therein.

What I claim is:

A combined telescopic flag pole and nameplate holder assembly comprising a plurality of telescopic pole sections including a lower section of greater diameter than the sections above the lower section, at least one intermediate section, and a top section, a flag detachably secured to said top section, the lower section being received in the ground to support the assembly and being tapered to substantially a point at its lower end and having a plurality of drainage openings in said lower end, the upper end of the lower section being provided with a cap having a hole therein to receive the intermediate section and a sealing gasket having an opening therein aligned with the opening in the cap and secured below the cap to form a seal between said intermediate section and the lower section, and means securing a nameplate to the lower section.

References Cited by the Examiner

UNITED STATES PATENTS

| | | | |
|---|---|---|---|
| 838,450 | 12/1906 | Redemeyer | 94—33 |
| 1,581,325 | 4/1926 | Sands | 116—173 |
| 2,090,783 | 8/1937 | Chinn | 116—173 |
| 2,271,609 | 2/1942 | Hall | 116—173 |
| 2,452,842 | 11/1948 | Davis | 116—173 |
| 2,748,745 | 6/1956 | Pobanz et al. | 116—173 |
| 2,878,303 | 3/1959 | Zacher | 248—43 |
| 3,105,459 | 10/1963 | Conn | 116—173 X |

FOREIGN PATENTS

| | | |
|---|---|---|
| 11,527 | 1906 | Great Britain. |
| 15,278 | 1912 | Great Britain. |

Publication: Popular Mechanics, July 1952 page 162, "Pointed Section of Bamboo Holds Small Flagpoles."

LOUIS J. CAPOZI, *Primary Examiner.*